United States Patent [19]

Quinn

[11] 3,901,381

[45] Aug. 26, 1975

[54] AUTOMATIC WARE HANDLER

[75] Inventor: Richard M. Quinn, Muncie, Ind.

[73] Assignee: Ball Brothers Service Corporation, Muncie, Ind.

[22] Filed: Oct. 10, 1973

[21] Appl. No.: 405,220

[52] U.S. Cl. .............. 198/283; 198/165; 356/198; 209/73
[51] Int. Cl. ............................................ B65g 47/24
[58] Field of Search .............. 198/33 AB, 165, 283; 356/198, 240; 250/223 B; 209/73

[56] References Cited
UNITED STATES PATENTS

| | | | |
|---|---|---|---|
| 1,333,006 | 3/1920 | Welser, Jr. ...................... | 198/33 AB |
| 2,407,062 | 9/1946 | Darrah ............................. | 198/165 |
| 2,577,341 | 12/1951 | Magnusson ..................... | 198/33 AB |
| 2,902,151 | 9/1959 | Miles et al. ..................... | 356/198 |
| 3,348,049 | 10/1967 | Stacey ............................. | 250/223 B |
| 3,356,203 | 12/1967 | Noble et al. .................... | 198/33 AB |
| 3,428,174 | 2/1969 | Kulig ............................... | 209/73 |
| 3,557,933 | 1/1971 | Sopher ............................ | 198/33 AB |
| 3,690,456 | 9/1972 | Powers, Jr. ..................... | 209/73 |
| 3,722,657 | 3/1973 | Kienle et al. ................... | 198/33 AB |
| 3,743,074 | 7/1973 | Sorbie ............................. | 198/33 AB |

Primary Examiner—Evon C. Blunk
Assistant Examiner—Richard K. Thomson
Attorney, Agent, or Firm—J. David Haynes

[57] ABSTRACT

Parallel rotating belts are positioned to engage opposite sides of ware to convey the ware to and from an inspection station. The belts move at different speeds to both accelerate the speed of the wave above that of the conveyor upon which the ware rests and to rotate the ware as the ware approaches the inspection station. The ware is rotated at a higher speed during inspection than when approaching the inspection station. As it leaves the inspection station the parallel belts co-act to slow the rotation of the ware. The slower of the parallel belts is longer than the faster belt and acts to force the ware against a stabilizer bar as the ware leaves the automatic ware handler to further retard rotation of the ware and to decelerate its movement in the direction of the conveyor belt so that the ware leaves the automatic ware handler in a stable condition.

11 Claims, 6 Drawing Figures

AUTOMATIC WARE HANDLER

BACKGROUND OF THE INVENTION

This invention relates to the method and apparatus for automatically transporting ware to and from an inspection station, and more particularly to an arrangement of parallel belts rotating at different speeds being used to accelerate and rotate the ware as it approaches the inspection station and to rapidly transport the ware from the inspection station while slowing the rotational movement of the ware such that the ware exits the automatic ware handler in a stable condition.

There are numerous prior art devices for inspecting ware and particularly for inspecting glassware. Various means have been developed for utilizing a beam of light to inspect glassware. Most glassware check inspectors use a light beam to inspect the ware. When a light beam is directed on the glass wall, the light particles will be conducted through the wall, around the jar and some directly back out. Depending on the color and opaqueness of the glass, various amounts of light will be reflected, transmitted or absorbed by the container. If a light responsive device such as a photovoltaic cell is placed to receive this light, an electrical signal will be generated. The signal can then be processed and used to reject the ware at the proper time.

It is a common practice to have an inspection station wherein the ware is seized and either raised and rotated for inspection or rotated in place for inspection. In an effort to inspect an ever increasing volume of ware, there is a need for a more rapid method and apparatus for conveying the ware to and from the inspection station. Present devices use a conveyor belt or various indexing means to transport the ware to the inspection area. Indexing means increase the cost of the inspection apparatus substantially. In a system wherein the ware is rapidly rotated for inspection, the ware is somewhat unstable when it is released from the inspection station since it is then resting on a moving conveyor belt and spinning at a high rate of speed. Accordingly, ware is prone to fall over on the conveyor belt and thus jam the machine. Thus, there is a need to brake the rotational movement of the ware as the ware is released from the inspection station. A present apparatus for braking utilizes a power arm which is part of the inspection station to hold the ware against a stop pad to cause the ware to no longer rotate, the ware is then released from the inspection station. The longer the ware is held in this braked position the slower the overall speed of the machine becomes.

Accordingly, there is a need for a device that will perform the function of advancing ware to and from an inspection station with a greater speed than is now available by use of state-of-the-art devices. Additionally, there is a need for a device that does not necessitate the critical adjustment of numerous components such as the speed of the conveyor belt, the speed of the inspection station and the dwell time of the brake arm in connection with the output of a glass forming machine in order to perform an inspection of the ware.

SUMMARY OF THE INVENTION

The present invention provides a mechanism to separate in-line ware, present it to an inspection station and then return the ware to a conveying means in a stable condition. An indexing mechanism is used to separate the ware as it approaches the automatic ware handler. Parallel rotating belts are used to convey the ware to and from the inspection station. The parallel belts are positioned on either side of the conveyor belt and in contact with the circumferential side of the ware. The belts move at different speeds to thus rotate the ware as it approaches the inspection station and to brake the rotation of the ware as it leaves the inspection station. After inspection, the ware is moved to the exit station where the defective ware is rejected.

When the ware enters the automatic ware handler, it is accelerated by the rotating belts and moved to the inspection station. A sensor is used to detect the presence of the ware at the inspection station. A positioning mechanism is then activated to push the ware against a spinning rotate wheel which causes the ware to rotate for inspection. During this period the inspection sensors scan the ware for various defects. At the end of the rotate period, the positioning mechanism is deactivated to release the spinning ware. Upon release the ware is again in contact with the rotating belts which accelerate the ware from the inspection station and retard the rapid rotation imparted to the ware during inspection.

The slower rotating belt is somewhat longer than the faster rotating belt and serves to further retard the movement of the ware as it exits the inspection station by pressing the ware against a stabilizer bar. The co-action between the slower moving belt and the stabilizer bar causes the ware to tend to rotate in the opposite direction from which it has previously rotated. The result is that the ware leaves the automatic ware handler in a stable condition.

It is a primary object of this invention to provide a device for rapidly transporting ware to and from an inspection station.

Another object of this invention is to provide a device wherein the ware is rotated as it approaches the inspection station and wherein the rotational speed of the ware during inspection is impeded after release from the inspection station to cause the ware to leave the automatic ware handler in a stable condition.

DESCRIPTION OF THE PREFERRED EMBODIMENT

Figure 1:
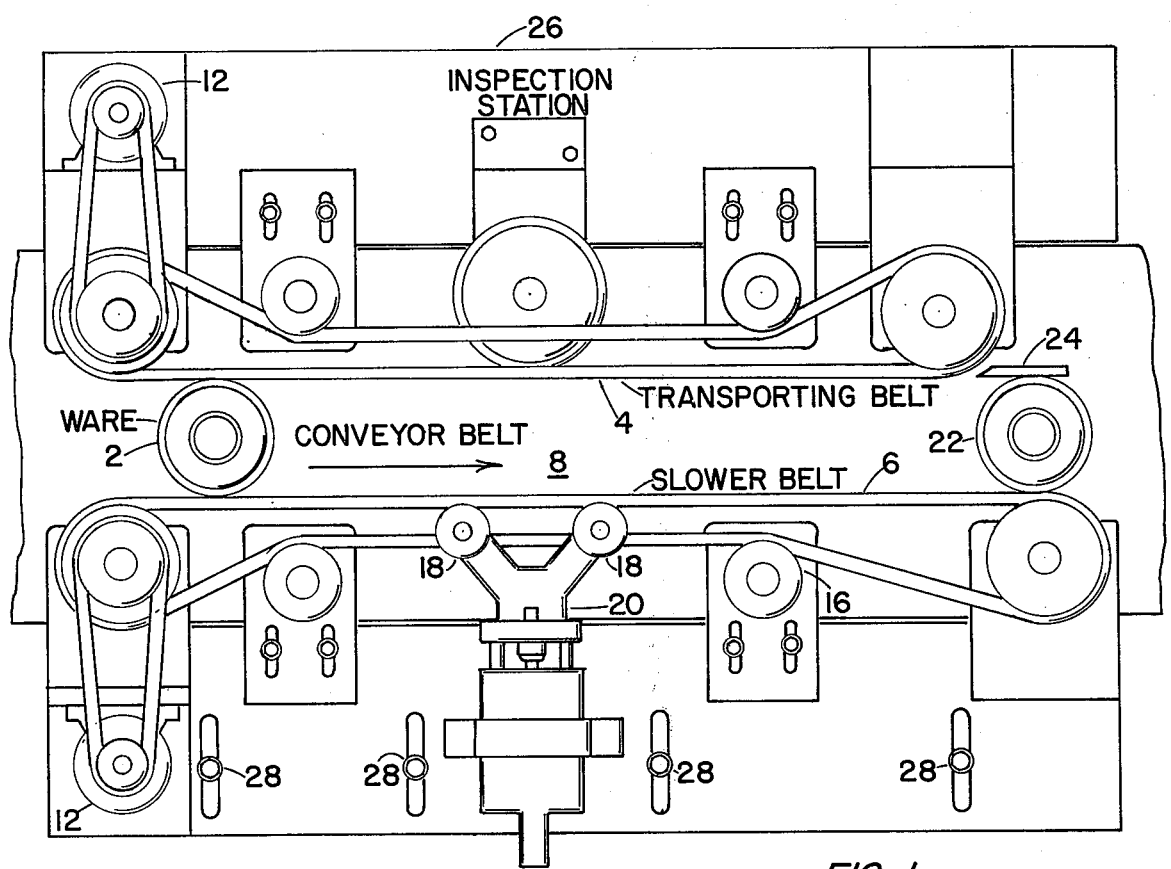
FIG. 1 is a schematic diagram of the present device as viewed from the top.

Referring to FIG. 1, as container 2 enters the automatic ware handler, transporting belt 4 and slower belt 6 contact the sides of the container. The container is transported to the automatic ware handler by conveyor belt 8. The portions of transporting belt 4 and slower belt 6 in contact with the surface of container 2 are moving in the same direction as conveyor 8. Transporting belt 4 moves at a speed in excess of that of slower belt 6 and faster than the speed of conveyor belt 8. Conveyor belt 8 has a speed in excess of that of slower belt 6. Accordingly, container 2 is caused to rotate in a clockwise position as it approaches rotate wheel 10. Variable speed motors 12 are utilized to drive the transporting belt and the slower belt through conventional pulley arrangements. Idler pulleys 14 and 16 are adjusted to maintain the proper tension in transporting belt 4 and slower belt 6. Rotate drive wheel 10 is driven by a variable speed motor (not shown). The rotate speed of rotate drive wheel 10 is adjusted to provide for a predetermined degree of rotation for a container during the period in which the inspection station is in an operative position. Idler wheels 18 mounted on rotate yoke 20 may also be adjusted to provide maximum stability to the container during the inspection process. Ideally, the idlers would be 120° apart around the circumference of the jar.

Figure 2:
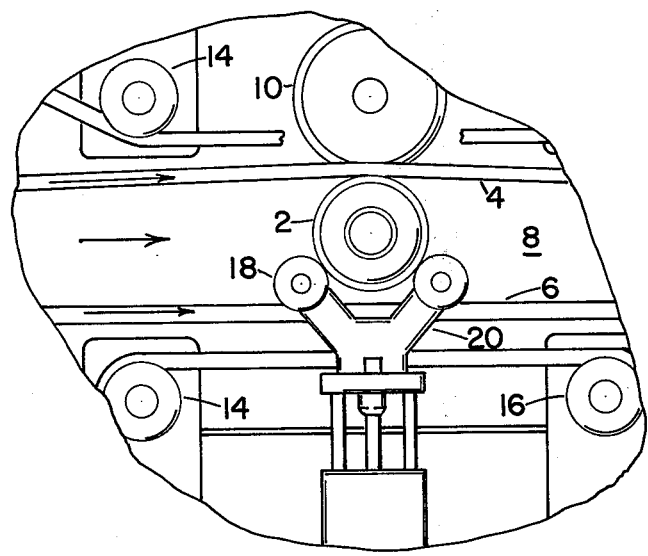
FIG. 2 is a partial schematic of the present invention showing the inspection station in an operated position.

FIG. 2 discloses a container in the "inspection" station. As the container approaches the inspection station, its presence is detected by conventional electronic means (not shown) and after a predetermined delay time the rotate yoke 20 is caused to move in the direction of rotate drive wheel 10 to seize container 2 therebetween. The circumference of ware 2 remains in contact with transporting belt 4 while being rotated. Belt 4 is sufficiently flexible to accommodate the movement of the ware against rotate wheel 10 and away from belt 6. Rotate wheel 10 causes the ware to rotate more rapidly than does transporting belt 4 and slower belt 6. After the ware has been rotated for inspection (e.g., slightly more than one revolution) rotate yoke 20 is moved away from ware 2. Transporting belt 4 urges ware 2 against slower belt 6 and the combined forces of conveyor belt 8, transporting belt 4 and slower belt 6 co-operate to move ware 2 forward along conveyor belt 8 and out of the inspection area and the automatic ware handler. Since transporting belt 4 is moving faster than slower belt 6 the rotation of ware 2 is dampened; ware 2 is rotating very rapidly at the instant it is released from contact with rotating wheel 10 and idler wheels 18.

Referring again to FIG. 1 it should be noted that slower belt 6 has a greater length for contacting ware 2 than does transporting belt 4. It is the co-operation of belt 4, belt 6 and conveyor belt 8 which provides the stability to ware 2 such that it does not fall when exiting the automatic ware handler. Ware 22 is shown leaving the automatic ware handler. It will be noted that ware 22 is still in contact with slower belt 6 and is now in contact with stabilizer bar 24. During this time the rotation of container 22 is further deterred by the co-action between slower belt 6 and bumper bar 24 and may even be reversed. Remembering that the speed of conveyor belt 8 is greater than the speed of slower belt 6 it can readily be appreciated that the co-action between stabilizer bar 24 and slower belt 6 acts to impede the rotation of ware 22 and cause the ware to emerge from the automatic ware handler in a stable condition. The ware will emerge at substantially the horizontal speed of conveyor belt 8 and with substantially no rotation.

Figure 3:
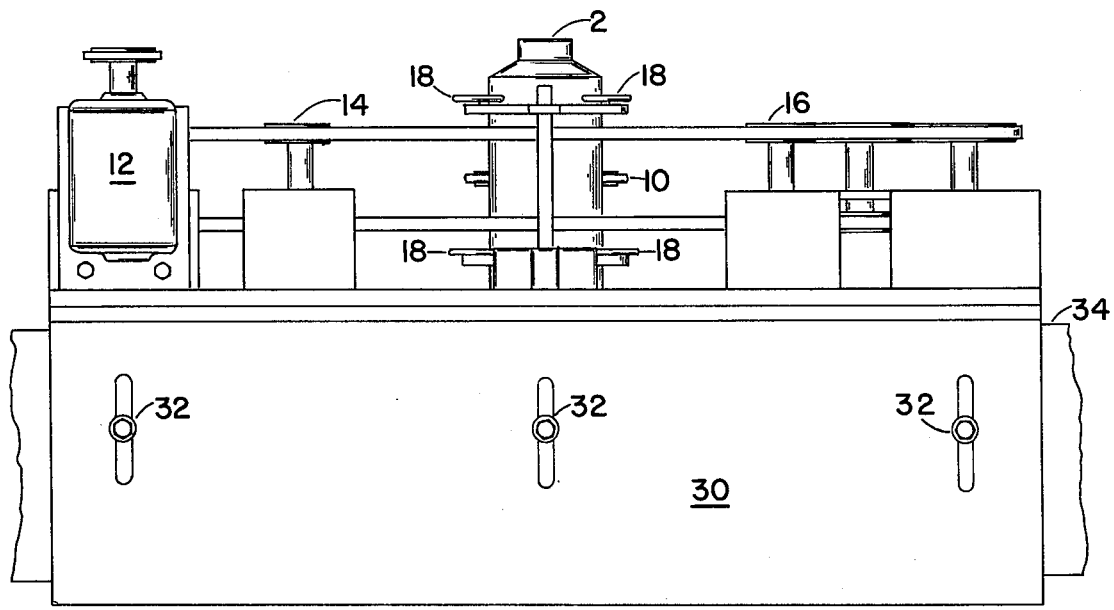
FIG. 3 is an elevational view of the present invention as viewed from a side.
Figure 4:
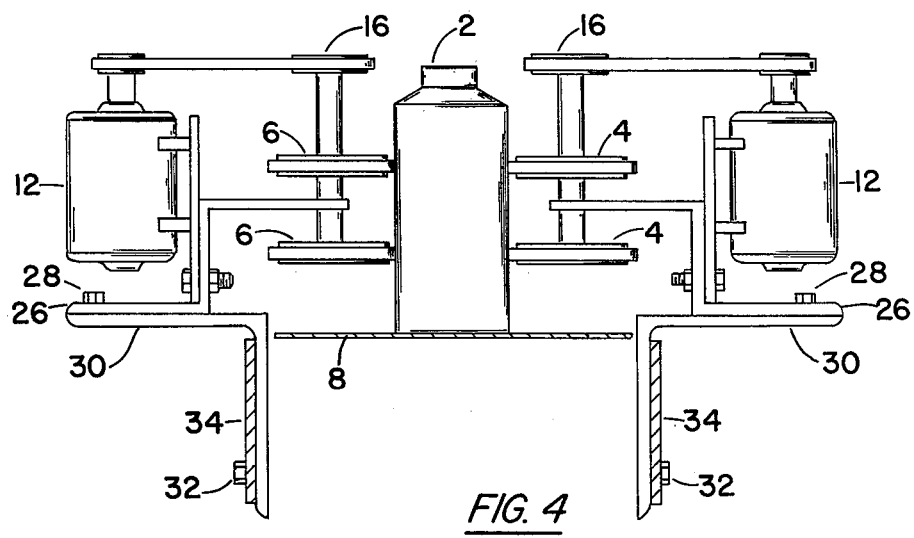
FIG. 4 is an elevational view of the present invention as viewed from the end.

Referring to FIG. 4, it may readily be appreciated that the automatic ware handler may be adjusted to accommodate different size ware. Mounting brackets 26 are slideably disposed on support members 30 and may be fixedly disposed thereon by appropriate adjustment of lock nuts 28. By proper adjustment of brackets 26 the belt arrangement may be positioned to accommodate ware having different diameters. The vertical displacement of the belt is also made adjustable as is shown in FIG. 3. Mounting brackets are similarly adjustable on support structure 34. While the preferred embodiment shows two transporting belts 4 and two slower belts 6 arranged one above the other, it should be apparent that two belts would not be necessary on each side of some containers.

The operating parameter of the present invention may be varied to provide different periods of inspection and to accommodate varying numbers of ware in a period of time. Without limiting the present invention, perhaps a set of parameters would aid in understanding the present invention. With the speed of the conveyor belt being approximately 80 feet per minute, the present device would process approximately 127 units per minute. The motor driving slower belt 6 would have a speed of 32 revolutions per minute while the motor driving transporting belt 4 would have a speed of approximately 100 revolutions per minute. The drive wheel 10 would need to have a speed of approximately 90 revolutions per minute in order to provide an inspection period of approximately 1 ¼ revolutions of the ware. The reason for causing the ware to rotate more than one revolution is to provide one-quarter revolution-time for the ware to stabilize against rotate wheel 10 and idlers 18 before the inspection process is commenced.

Figure 5:
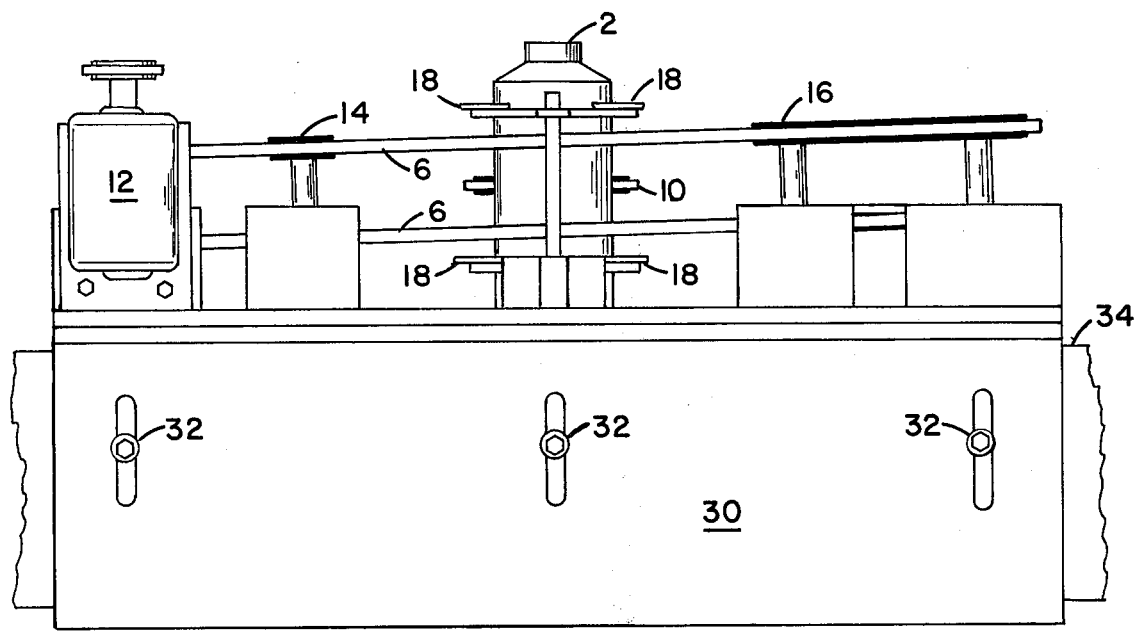
FIG. 5 is a view similar to FIG. 3 illustrating another embodiment of the invention.
Figure 6:
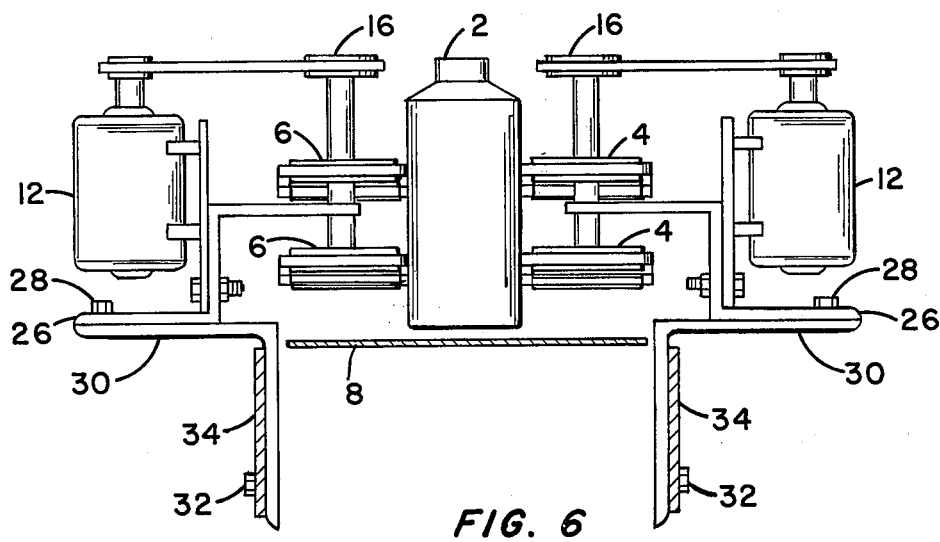
FIG. 6 is a view similar to FIG. 4 illustrating further the embodiment of FIG. 5.

As illustrated in FIGS. 5 and 6, parallel belts 4 and 6 may be positioned to lift ware 2 from conveyor belt 8 during contact and travel with belts 4 and 6. More specifically, this is accomplished by positioning belts 4 and 6 to diverge from conveyor belt 8 in the direction of travel of ware 2. In this manner, ware 2 is elevated from conveyor belt 8 during the approach to the inspection station thereby avoiding the need to elevate ware 2 during the inspection process.

I claim:

1. An apparatus for imparting rotary motion to cylindrical articles and thereafter stabilizing such articles during rotary deceleration in conjunction with concurrent imparting of translational movement, comprising: a first continuous belt mounted for movement and spaced from but adjacent to a conveyor belt; a second continuous belt mounted for movement and in part positioned adjacent the first belt and spaced a substantially constant distance therefrom; means for driving the first and second belts at constant but differing linear speeds in a common direction; a rotary drive wheel means positioned adjacent one of the first or second belts; and an idler means mounted opposite the rotary drive wheel for reciprocal movement towards and away from the drive wheel, whereby cylindrical articles such as glassware may be positioned between the first and second belts, and, as a result of the differing linear speeds thereof, rotated while being moved in a translational manner to a position adjacent the drive wheel whereupon the reciprocating idler means may engage and displace the rotating article transversely of the first and second belts into contact with the drive wheel to impart a greater rotary motion to the article, and, thereafter release the rapidly-spinning article to stabilizing influence of the first and second belts which decelerate the article with regard to rotary motion and move the article with translational movement away from the drive wheel and idler means.

2. Apparatus as set forth in claim 1 in which the belt having the greater linear speed diverts from the transport path along the conveyor belt in common with the slower moving belt and a static stabilizer bar is positioned in a location relative to the slower moving belt corresponding to the constantly-spaced relationship between the first and second belts immediately beyond the diversion point of the faster moving belt, whereby articles passing between the stabilizer bar and slower moving belt are urged to rotate in a direction opposite in sense of the rotation imparted by the coaction of the faster-moving and slower-moving belts.

3. Apparatus as set forth in claim 1 in which the idler means comprise at least one bifurcated arm mounted for reciprocal motion in directions perpendicular to the direction of travel of the first and second belts, the bifurc ed arm carrying rotatably-mounted idler wheels at the end portions of the bifurcations of the arm.

4. Apparatus as set forth in claim 3 in which the idler means also include a second bifurcated arm with a second set of idler wheels spaced axially with regard to the rotational axis of the idler wheels, whereby one set of idler wheels is positioned to engage an upper portion of an article and the other set is positioned to engage the lower portion.

5. Apparatus as set forth in claim 4 in which the idler wheels of the idler means are spaced vertically an equal distance from the plane of rotation of the rotary drive wheel means.

6. Apparatus as set forth in claim 1 in which a second set of spaced belts are included, one each of which correspond with regard to linear speed to the first and second continuous belts but each of which are spaced perpendicular to the direction of spacing between the first and second belts from the corresponding first or second belt.

7. Apparatus as set forth in claim 1 in which the constantly-spaced portions of the first and second continuous belts diverge from the conveyor belt with an increasing distance therebetween in the direction of travel of such belts along such portions, whereby articles engaged by the first and second belts will be lifted from the conveyor belt as a result of contact with the first and second belts.

8. Apparatus for imparting selectively translational and rotary motion to cylindrical articles such as glassware, and for stabilizing, accelerating and decelerating the articles with regard to rotary motion, comprising: a conveyor belt for carrying such articles; a first continuous belt mounted for movement in the direction of travel of the conveyor belt and spaced from but adjacent to the conveyor belt; a second continuous belt mounted for movement at least in part parallel to the first belt and in part spaced a substantially constant distance corresponding to the diameter of the articles to be conveyed from the first continuous belt; means for driving the first and second continuous belts at constant but differing linear speeds in a common direction along the constantly-spaced portions thereof; means for imparting substantially rotary motion to the articles mounted adjacent one of the continuous belts along the constantly-spaced portion thereof; means for laterally displacing articles between the first and second continuous belts into contact with the means for imparting rotary motion to the articles; and a sensor means for initiating movement of the means for displacement upon movement of an article between the first and second continuous belts into a location adjacent the means for displacement, whereby articles carried on the conveyor belt are conducted between the first and second belts, rotated as a result of the differing linear speeds of the first and second belts, and, upon reaching a position adjacent the means for imparting rotary motion, laterally displaced and rapidly rotated for inspection, and thereafter decelerated with regard to rotary motion while being translationally moved by the rotary belts in a stabilized manner.

9. Apparatus as set forth in claim 8 in which a static stabilizer bar is positioned adjacent the termination of the constantly-spaced portion of the faster moving of the first and second belts, and in which the slower moving of such belts continues in the constantly-spaced relationship with regard to the static stabilizer bar, whereby an opposite rotation as is imparted by the first and second belts is applied to the article by the stabilizer bar and the slower moving belt.

10. A method of conducting cylindrical articles to a rotary inspection station, comprising: conveying the articles between first and second spaced belts; engaging the articles upon opposite cylindrical sides thereof by the first and second belts; transporting the articles with both translational and rotary movement by moving the first and second belts at a constant speed in a common direction at differing linear speeds; displacing the articles laterally to the direction of the belts out of contact with one of the belts and into contact with an inspection station which moves the articles at a high rotary speed but with no translational movement; returning the articles to contact with the first and second belts for deceleration from the higher rate of rotation imparted by the inspection station and for translational movement away from the inspection station; and positioning the articles on the conveyor belt for movement away from the first and second belts.

11. A method as set forth in claim 10 in which the articles, after leaving the inspection station and being rotated at a lower rotational speed by the spaced belts, are conducted between a static stabilizer bar and the slower moving of the first and second belts to further substantially decelerate the articles with regard to rotational movement before placement on the conveyor belt without the influence of the stabilizing first and second belts.

* * * * *